US007286825B2

(12) United States Patent
Shishido et al.

(10) Patent No.: US 7,286,825 B2
(45) Date of Patent: Oct. 23, 2007

(54) METHOD FOR COMMUNICATION AMONG MOBILE UNITS AND VEHICULAR COMMUNICATION APPARATUS

(75) Inventors: Hiroshi Shishido, Iwaki (JP); Koyo Hasegawa, Tokyo (JP); Masana Minami, Koganei (JP); Nozomu Saito, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 461 days.

(21) Appl. No.: 10/643,763

(22) Filed: Aug. 19, 2003

(65) Prior Publication Data

US 2004/0116106 A1    Jun. 17, 2004

(30) Foreign Application Priority Data

Aug. 19, 2002    (JP)    ............. 2002-237928

(51) Int. Cl.
*H04Q 7/20*    (2006.01)

(52) U.S. Cl. .............. 455/435.1; 455/456.1; 455/411; 370/328

(58) Field of Classification Search ............. 455/435.1, 455/456.1, 411; 370/328
See application file for complete search history.

(56) References Cited

U.S. PATENT DOCUMENTS

| | | | |
|---|---|---|---|
| 4,823,373 A | | 4/1989 | Takahashi et al. |
| 5,875,183 A | * | 2/1999 | Nitadori ............... 370/328 |
| 6,292,747 B1 | | 9/2001 | Yousef et al. |

(Continued)

FOREIGN PATENT DOCUMENTS

DE    33 37 648 A1    2/1987

(Continued)

OTHER PUBLICATIONS

Beongku, An, et al., "A mobility-based clustering approach to support mobility management and multicast routing in mobile ad-hoc wireless networks", *International Journal of Network Management*; Wiley, GB; Dec. 2001, pp. 387-395, XP002333507; ISSN: 1055-7148.

*Primary Examiner*—Lester G. Kincaid
*Assistant Examiner*—Charles Shedrick
(74) *Attorney, Agent, or Firm*—Brinks Hofer Gilosn & Lione

(57) ABSTRACT

A method for communication among mobile units and vehicular communication apparatus make it possible to automatically establish connection with a party who can provide required information on the basis of an environment or condition change of a driver or a vehicle or in response to a driver's request so as to permit communication with the party. An inter-vehicle communication apparatus of a vehicle acquires information from other mobile units through physical networks while it is moving or stopped, and registers, in a member table, mobile units satisfying predetermined conditions on the basis of the acquired information as the members of different virtual logic networks according to the conditions. In such a state, the inter-vehicle communication apparatus selects one virtual logic network from among a plurality of virtual logic networks on the basis of an environment or condition change of a driver or a vehicle or in response to a driver's request so as to permit communication with the party. The selected virtual logic network is set as an active network to establish connection with a predetermined mobile unit in the active network thereby to request or provide required information from or to the mobile unit.

20 Claims, 6 Drawing Sheets

U.S. PATENT DOCUMENTS

| | | | |
|---|---|---|---|
| 6,647,270 B1 * | 11/2003 | Himmelstein | 455/456.1 |
| 7,200,409 B1 | 4/2007 | Ichikawa et al. | |
| 2001/0022780 A1 | 9/2001 | Akihiko et al. | |
| 2002/0026266 A1 * | 2/2002 | Montague | 701/1 |
| 2003/0096593 A1 * | 5/2003 | Naboulsi | 455/411 |

FOREIGN PATENT DOCUMENTS

| | | |
|---|---|---|
| GB | 2358506 | 7/2001 |
| JP | 09-325991 | 12/1997 |
| JP | 2000-090395 | 3/2000 |
| JP | 2001-118191 | 4/2001 |
| JP | 2001-266291 | 9/2001 |
| JP | 2001-358641 | 12/2001 |
| JP | 2002-056495 | 2/2002 |
| JP | 2002-183899 | 6/2002 |
| WO | WO 00/46777 A | 8/2000 |
| WO | 01/037240 | 5/2001 |
| WO | WO 02/059640 A2 | 8/2002 |

* cited by examiner

FIG. 2

| TYPE OF NETWORK | SITUATIONS/ ENVIRONMENTS | NETWORK MEMBERS | SWITCHING CONDITIONS | |
|---|---|---|---|---|
| COMMUNI-CATION | NORMAL | NEIGHBORING VEHICLES, NEIGHBORING DRIVERS, PEDESTRIANS (ROAD CONDITIONS AROUND ONE'S CAR) | GREETING, THANK YOU, WARNING, INTERRUPT, GETTING ON EXPRESSWAY, APPROACHING/ENTERING INTERSECTION | ~VN1,A |
| | | FRIENDS, PEERS, FAMILY MEMBERS | | ~VN2,B |
| | | CIRCLE/CLUB GROUPS, CHATTING FRIENDS | | ~VN3 |
| | | JOBS, COMPANIES | | ~VN4 |
| | ABNORMAL (ENVIRONMENT/ CONDITION CHANGES) | NEIGHBORING VEHICLES, NEIGHBORING DRIVERS, PEDESTRIANS | REQUESTING HELP, ATTRACTING ATTENTION | ~VN5 |
| SHARING INFORMATION | INFORMATION ON TRAFFIC, ACCIDENTS, CONSTRUCTIONS | SAME LANE, VEHICLES TRAVELING IN SAME DIRECTION, NEIGHBORING VEHICLES | WHEN INFORMATION ON SURROUNDING IS OBTAINED, WHEN CHANGING ROUTE | ~VN6,C |
| | LOCAL INFORMATION | LOCAL INFORMATION ON CONDITIONS SURROUNDING ONE'S VEHICLE, P01 | | ~VN7 |
| SHARING RESOURCES | MAP DATA | COMMUNICATION NAVIGATOR USER GROUP | LOCAL, USE OF DESTINATION MAP | ~VN8,D |
| | SECRET PATH INFORMATION | SECRET PATH MAP, KNOW-HOW | AVOIDING TRAFFIC JAMS | ~VN9 |
| EMERGENCIES | TROUBLES, ACCIDENTS | NEIGHBORING VEHICLES, NEIGHBORING DRIVERS, PEDESTRIANS | WHEN EMERGENCIES HAPPEN | ~VN10 |
| | | MECHANIC'S SHOP, INSURANCE COMPANIES | | |

METHOD FOR COMMUNICATION AMONG MOBILE UNITS AND VEHICULAR COMMUNICATION APPARATUS

BACKGROUND OF THE INVENTION

1. Field of the Invention

The present invention relates to a method for communication among mobile units and a vehicular communication apparatus and, more particularly, to a method for communication among mobile units and a vehicular communication apparatus that make it possible to automatically connect to a party who is capable of providing necessary information on the basis of an environment or condition change of a driver or a vehicle or in response to a driver's request so as to effect communication with the party.

2. Description of the Related Art

With increasingly advanced communication technology, communication between mobile units, such as between automobiles (hereinafter referred to as "inter-vehicle communication"), has become possible. Conventional inter-vehicle communication, however, has been such that a driver specifies a party to be connected and establishes connection with the party through a network to effect communication.

Hence, the conventional inter-vehicle communication does not permit automatic connection and communication with an optimum party on the basis of an environment or condition change of a driver or a vehicle or in response to a driver's request.

For instance, the compartment of a vehicle is usually a closed space, and vehicles or pedestrians around the vehicle can hardly know a condition in the compartment. However, there are some cases where anomalies or accidents occur in the compartment, such as a driver suddenly developing a physical disorder, although they cannot be visually recognized from outside. In such a case, it would be convenient if an anomaly or accident in the compartment can be automatically detected and reported to a nearby vehicle or pedestrian. This has not been possible in the conventional inter-vehicle communication.

In addition to the serious cases mentioned above, there are minor cases where, for example, a driver may want to ask another driver to yield a right of way or to ask a pedestrian nearby a direction to go to a predetermined destination when the driver is inching along in a traffic jam, or may want to say thank you to a driver who kindly yields the way. This has not been possible.

Furthermore, it would be convenient if the position and speed of a vehicle traveling ahead in the same lane or direction can be acquired when neighboring vehicles are slowing down, so that a traffic jam occurring ahead may be known in order to accomplish early rerouting. This, however, has not been possible in the conventional inter-vehicle communication.

In the case of a communication-navigation system adapted to effect navigation by receiving geographical information from an external center providing the geographical information, geographical information can be shared as long as navigation devices are made by the same manufacturer. It would be convenient if a driver who wishes to acquire geographical information but cannot access the center due to a busy line could communicate with a driver of a vehicle equipped with a navigating device made by the same manufacturer so as to acquire geographical information from the vehicle. This has not been possible in the conventional inter-vehicle communication, either.

Furthermore, there are cases where a driver wishes to say thank you to a predetermined neighboring driver, as necessary, when the neighboring driver lets the driver in the lane, to give a notice when entering an arterial highway or an express highway, or to ask a neighboring driver's intention when making a right or left turn at an intersection. This feature is not available with the conventional inter-vehicle communication technology.

The above merely indicates some exemplary occasions where the communication feature, which is not available with the conventional communication technology, would conveniently permit communication with a particular driver.

SUMMARY OF THE INVENTION

Accordingly, an object of the present invention is to make it possible to automatically connect and communicate with a driver who is able to provide required information on the basis of an environment or condition change of a driver or a vehicle or in response to a driver's request.

To this end, according to one aspect of the present invention, there is provided a method for communication among mobile units, including the acts of: (1) acquiring information from another mobile unit through a physical network while an automobile is moving or stopped; (2) registering a mobile unit that satisfies predetermined conditions as a member of a virtual logic network by referring to the acquired information; and (3) selecting a communicating party from among the members of an appropriate virtual logic network according to an event when it takes place and communicating with the party.

According to another aspect of the present invention, there is provided a method for communication among mobile units, including the acts of: (1) acquiring information from another mobile unit through a physical network during travel or stop of an automobile; (2) registering mobile units that satisfy predetermined conditions as members of virtual logic networks based on the conditions by referring to the acquired information; (3) selecting one virtual logic network from among the plurality of virtual logic networks according to an environment or situation change of a driver or a vehicle or in response to a driver's request; and (4) setting the selected virtual logic network as an active network, and establishing connection with a particular mobile unit in the active network to request or supply necessary information.

According to yet another aspect of the present invention, there is provided a vehicular communication apparatus for effecting communication between mobile units, including: (1) an information acquirer for acquiring information from another mobile unit through a physical network while an automobile is moving or stopped; (2) a registrar for registering, in a member table, a mobile unit that satisfies a predetermined condition as a member of a virtual logic network based on the condition by referring to the acquired information; and (3) a communicating party selector for selecting a communicating party by using the table of the virtual logic networks according to an event when it takes place and communicating with the selected party.

According to a further aspect of the present invention, there is provided a vehicular communication apparatus for effecting communicate among mobile units, including: (1) an information acquirer for acquiring information from another mobile unit through a physical network while an automobile is moving or stopped; (2) a virtual network generator for registering a mobile unit that satisfies a predetermined condition as a member of a virtual logic network based on the conditions by referring to the acquired information; (3) a selector for selecting a particular virtual logic network from the plurality of virtual logic networks on the basis of an environment and situation change of the driver or vehicle or in response to a driver's request; and (4) a device for setting the selected virtual logic network as an active network, thus establishing connection with a particular mobile unit in the active network to request or supply necessary information.

The above arrangements make it possible to automatically connect and communicate with a driver who is able to provide required information on the basis of an environment or condition change of a driver or a vehicle or in response to a driver's request. Thus, desired or necessary information can be acquired from or supplied to the communicating party.

BRIEF DESCRIPTION OF THE DRAWINGS

FIG. 2 is an explanatory diagram illustrating virtual logic networks and switching conditions or communication starting conditions;

DETAILED DESCRIPTION OF THE PREFERRED EMBODIMENTS (A) Summary of the Present Invention FIG. 1 is a block diagram illustrating the present invention adapted to effect communication according to the following procedure (1) through (3).

(1) An inter-vehicle communication controller (not shown) of a vehicle 10 of interest connects itself to a neighboring mobile unit, such as a vehicle or a pedestrian, through a physical network constructed of a physical communication unit so as to acquire necessary information while the vehicle 10 is moving or stopped. The physical network in this case is a network of a physically communicable range that allows communication with neighboring vehicles or pedestrians by an inter-vehicle communication technology. Applicable communication means include wireless LAN, Bluetooth, cellular phones, such as mobile IP and IPV6. The above necessary information includes mobile unit IDs, the attributes of drivers, the attributes of in-vehicle equipment, the positions and/or speeds of vehicles, the information being required to determine whether predetermined conditions to be discussed hereinafter are satisfied.

Figure 1:
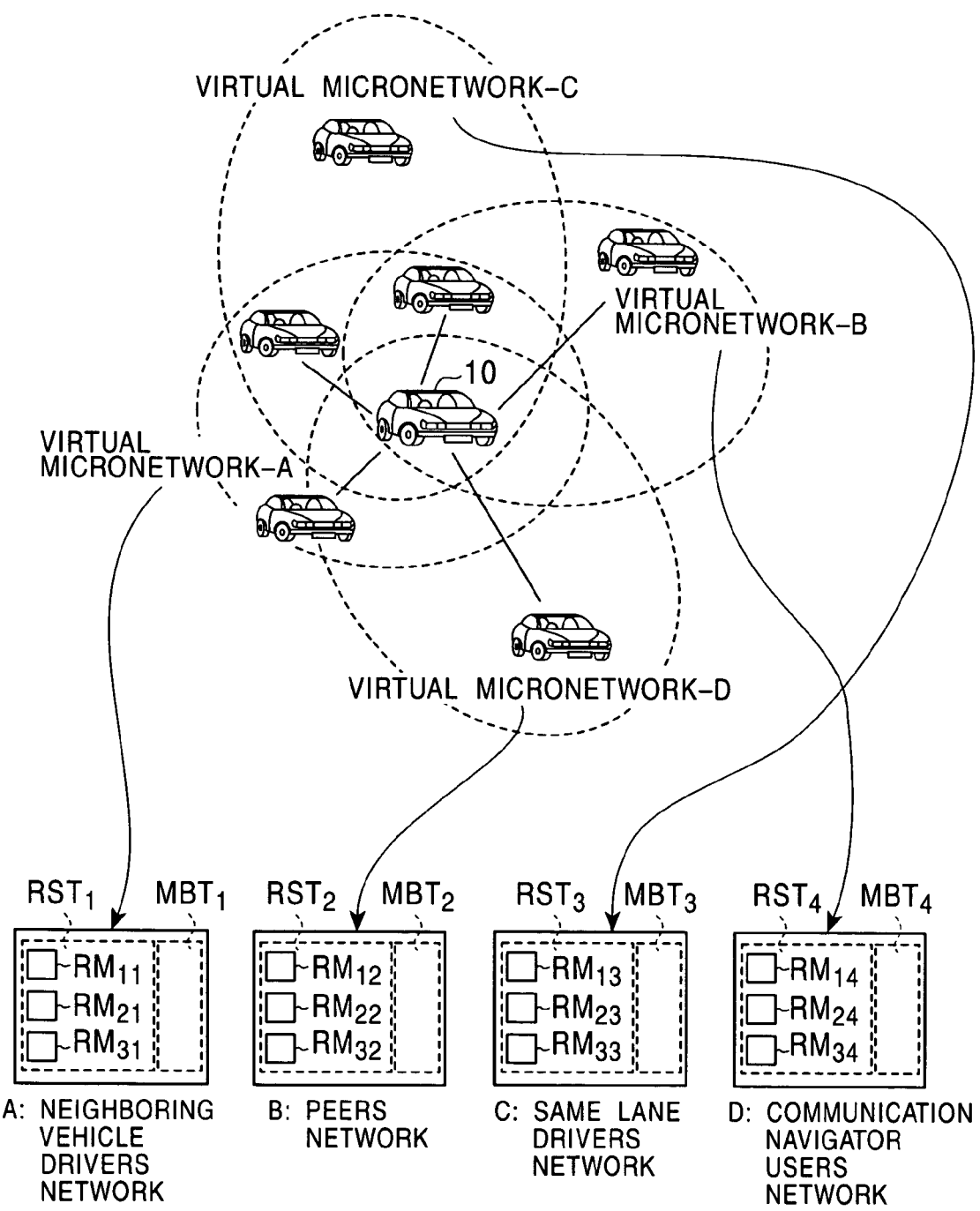
FIG. 1 is a block diagram illustrating the present invention.

(2) Then, the inter-vehicle communication controller refers to the acquired information to form a virtual logic network of mobile units that satisfy a predetermined condition. Similarly, the inter-vehicle communication controller forms another virtual logic network of mobile units that satisfy another condition. More specifically, the controller creates a member table MBTi and a resource table RSTi for each virtual logic network. The member table MBTi shows the members constituting each virtual logic network, while the resource table RSTi shows the capabilities (communication devices, input/output devices, and information to be supplied) $RM_{ij}$. FIG. 1 shows the following types of networks as the virtual logic networks:

A: Neighboring vehicle drivers network
B: Peers network
C: Same lane drivers network
D: Communication navigator users network Neighboring vehicle drivers network A is a virtual logic network whose members are the vehicles, drivers and pedestrians around a vehicle of interest. Inclusion in this network is decided on the basis of positional information. Peers network B is a virtual logic network applied to a case where a group of friends, peers, family members or the like is formed for a drive. The vehicles making up this group are the members of this virtual logic network. Inclusion in this network is decided on the basis of the attributes of drivers. Same lane drivers network C is a virtual logic network whose members are the vehicles traveling in the same lane or direction as that of the vehicle of interest. Inclusion in this network is decided on the basis of the positional information for each vehicle and a guide route of the vehicle of interest. Communication navigator users network D is a virtual logic network whose members are the vehicles capable of sharing map data. Inclusion in this network is decided on the basis of the attributes of on-vehicle equipment.

(3) Then, the inter-vehicle communication controller selects, from among the plurality of virtual logic networks, a virtual logic network capable of providing required information on the basis of an environment or condition change of a driver or a vehicle or in response to a driver's request. The selected virtual logic network is set as an active network, and the controller connects to a particular member or mobile unit making up the active network so as to request or supply required information.

For instance, if the inter-vehicle communication controller detects that the vehicle of interest has continuously moved at low speed for a predetermined time or more, then it sets same lane drivers network C as the active network. The controller then checks the capabilities or the current positions of the members or vehicles of the active network, and communicates with a vehicle ahead or an intermediate vehicle to notify the controller of their speeds. If the reported speeds are a set speed or less, then it may be determined that a traffic jam is taking place ahead.

Furthermore, if the inter-vehicle communication controller detects an automobile entering an arterial highway or an express highway, then the controller sets neighboring vehicle drivers network A as an active network. The controller then checks the capabilities or the current positions of the members or vehicles of the active network, and communicates with a vehicle on the arterial highway or the express highway behind its own vehicle to notify the vehicle of the driver's intention of entering the highway. When an acknowledgment is received, a message of appreciation is sent to the vehicle after completion of the entry.

(B) Virtual Logic Network and Switching Conditions

FIG. 2 is an explanatory diagram illustrating virtual logic networks and switching conditions or communication starting conditions. The virtual logic networks are formed by registering members and local resources or members' capabilities selected on the basis of predetermined conditions. In contrast to the physical networks, the logic network ranges are formed by relaying information. Triggering conditions include:
(1) an environmental or condition change in its own vehicle;
(2) a change in the environment surrounding the driver of the vehicle; and
(3) a driver's request or emotional change Among possible virtual logic networks VN1 through VN10, virtual logic networks VN1, VN2, VN6 and VN8 correspond to the foregoing neighboring vehicle drivers network A, peers network B, same lane drivers network C and communication navigator users network D, respectively.

Virtual logic networks VN1 through VN5 are characterized by mutual communication between mobile units. The virtual logic network VN1 includes, as its members, neighboring vehicles, neighboring drivers and pedestrians, and is actuated, e.g., when a driver wishes to say hello or thank you, or to give warning, or when the driver cuts in a line of vehicles or enters an express highway, or when approaching or entering an intersection. The virtual logic network VN2 includes friends, peers and family members as its members, and is actuated when the members wish to effect communication, which is expressed by, for example, pressing a key. The virtual logic network VN3 includes members sharing the same interests or hobbies, and is actuated when the members wish to effect communication. The virtual logic network VN4 includes business-related members, and is actuated when the members wish to effect communication. The virtual logic network VN5 includes neighboring vehicles, neighboring drivers and pedestrians as its members, and is actuated, e.g., when an anomaly of a driver is detected, requiring help or warning.

Virtual logic networks VN6 and VN7 are characterized by sharing information on traffic, accidents, construction or other local situations. These networks include, as their members, neighboring vehicles moving in the same lane or direction, and are actuated, e.g., when a drop in vehicular speed is detected, when information on ambient situations is obtained, or when a route is changed. The virtual logic network VN7 includes, as its members, mobile units capable of sharing local information or POIs (facilities) around their own vehicles. This network is actuated when a request is issued.

Virtual logic networks VN8 and VN9 are characterized by sharing resources, such as map data or information on secret paths. The members of the virtual logic network VN8 are vehicles capable of sharing map data, and the network is actuated, e.g., when a driver of a member vehicle has lost map data and tries to contact a map supplying center in vain due to a busy line. The members of the virtual logic network VN9 are mobile units capable of supplying secret path maps or know-how, and the network is actuated, e.g., when a driver of a member mobile unit requests the information or when a traffic jam is recognized.

The virtual logic network VN10 is used to deal with emergencies, such as mechanical failure and accidents. The VN10 includes, as its members, neighboring vehicles, neighboring drivers, pedestrians, mechanic's shops and insurance companies, and is actuated by the occurrence of an accident or mechanical failure.

(C) Construction of the Inter-vehicle Communication Apparatus

Figure 3:
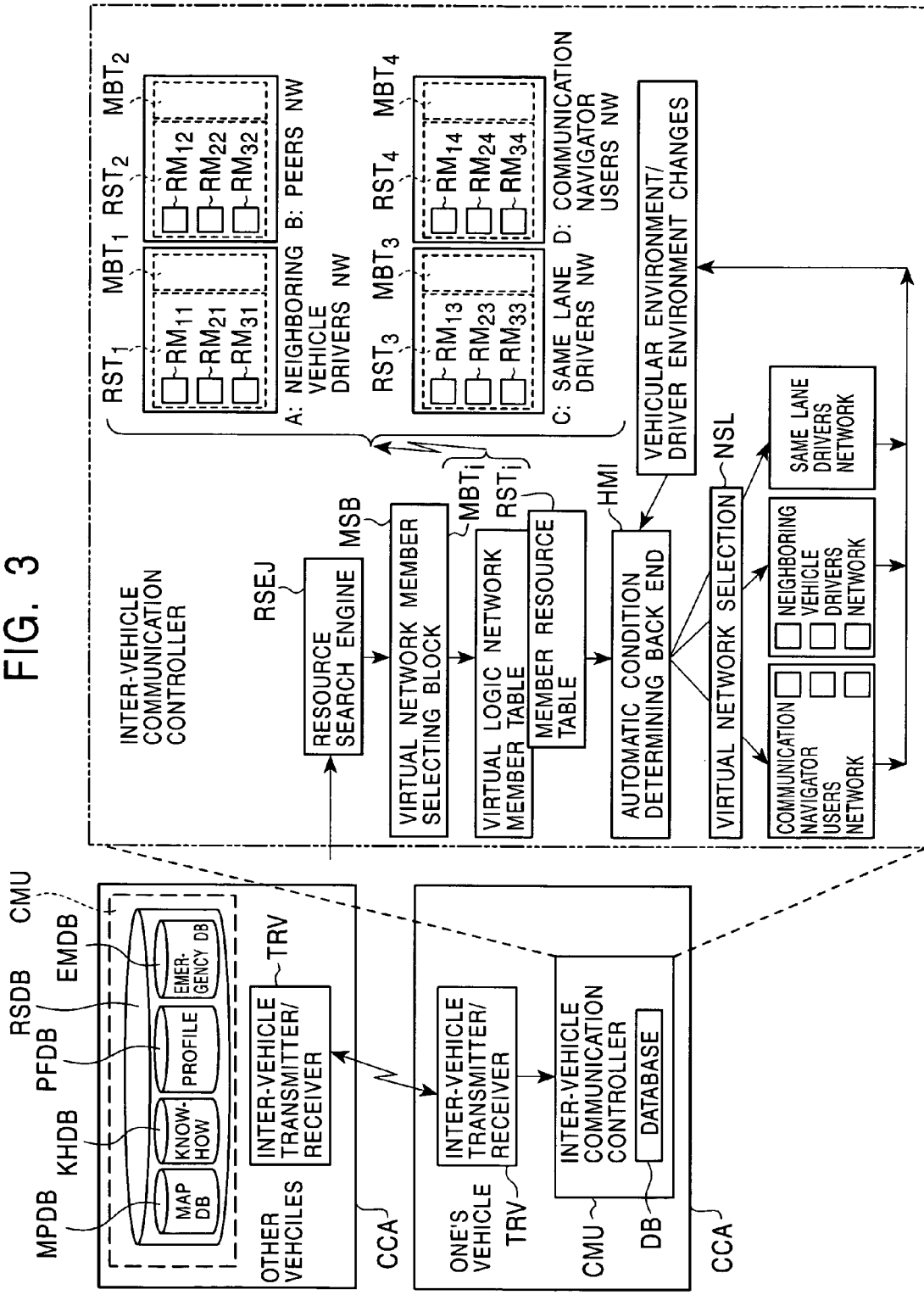
FIG. 3 is a block diagram of an inter-vehicle communication apparatus.

FIG. 3 is a block diagram of an inter-vehicle communication apparatus. Each vehicle is equipped with a communication apparatus CCA having the same construction. The CCA is provided with an inter-vehicle transmitter/receiver TRV and inter-vehicle communication controller CMU, and has a resource database RSDB. The resource database RSDB includes (1) a map database MPDB, (2) a know-how database KHDB, (3) a user profile database PFDB, and (4) an emergency database EMDB. The following shows the details of each database.

(1) User Profile Database (PFDB)

The PFDB includes personal information on drivers (genders, ages or generations, addresses and driving experiences, etc.), general information on vehicles (types and colors of vehicles, maintenance information, etc.), information on drivers' interests (hobbies, such as golfing, "go" (a Japanese game similar to chess), fishing, photographing, driving, traveling, etc., chatting about entertainment topics, gossips, topical news, etc.), and favorite types of music, singers, sports and sports players. The PFDB further includes peer information (friends, family members and work member tables), personal database information (music and video lists stored in an information database), and information regarding in-vehicle equipment, such as car navigators (individual in-vehicle equipment IDs, performance of in-vehicle equipment, such as the sizes of display areas, the availability of text-to-speech (TTS) feature, and covered area, accuracy, etc. of map database).

(2) Know-how Database (KHDB)

The KHDB includes statistical information regarding roads that member drivers drive daily, such as crowdedness and whether driving at high speed is safe, and other type of local information. The database includes information not included in navigation map databases, such as rough spots of particular roads, narrow streets, streets frequented by children or roads with many trucks. Statistical information further includes the exact spots and times that traffic jams take place, commuter traffic jam lanes, or traffic jams attributable to events. Local information includes, for example, extremely local information, such as the locations of private facilities allowing drivers to use their toilets.

(3) Map Database (MPDB) Information

The MPDB information includes a map database designed to be temporarily shared among member drivers, such as for points of interest (POI).

(4) Emergency Database (EMDB) Information

The EMDB includes the information required in case of emergencies, such as the types of emergencies, information regarding corrective measures in the form of step-by-step manuals for easily solving problems, the locations of mechanic's shops and the time required for repairs. The EMDB also includes detailed information on emergency hospitals, police stations, insurance companies (the names of persons in charge), and the like.

(D) Procedure for Preparing a Member Table of Virtual Logic Networks (1) Communication Procedure A member driver issues a radio signal from his or her inter-vehicle communication apparatus at regular intervals, e.g., once every second, to check if there is any nearby vehicle that is equipped with an inter-vehicle device that permits the communication. A vehicle that receives the signal responds to the vehicle sending the signal so as to establish their network. The information to be exchanged must include at least the individual IDs that permit the drivers to identify their vehicles. Such IDs may be the IDs provided by vehicle manufacturers or other type of information, including Ipv6.

When the network formation is completed, communication is effected between the two vehicles under the control of the inter-vehicle communication controller CMU to exchange information, such as information from the resource data base RSDB, information on the current positions of the vehicles, or the like. More specifically, a resource search engine RSEJ of the inter-vehicle communication controller CMU automatically determines whether communication with another vehicle is possible, then makes a connection with the vehicle to exchange information if the determination result is positive.

Subsequently, a virtual network member selecting block MSB refers to received information to determine whether another vehicle of each virtual logic network matches the member selecting conditions of the virtual logic network, and if it matches, then the MSB registers the vehicle in an associated member table MBTi as a member of the virtual logic network. In the figure, the virtual logic networks are classified as neighboring vehicle drivers network A, peers network B, same lane drivers network C and communication navigator users network D to simplify the description.

At the same time when member IDs are registered in the member table MBTi, the resources relating to the networks owned by the members are also registered in a resource table RSTi. The resources to be registered depend on the type of virtual logic network table and may be overlapped; it is advantageous, however, to select and register only the resources peculiar to the individual networks, thereby saving necessary memory capacity for the registration and also maintaining fast processing.

(2) Information and Resources to be Exchanged/Registered

The information and resources to be registered or exchanged between vehicles differ from one virtual logic network to another. The following will describe the information and resources to be registered and exchanged between vehicles in some virtual logic networks (e.g., a neighboring vehicle drivers network, a same lane drivers network, a communication navigator users network, and a peers network).

a. Neighboring Vehicle Drivers Network

This type of network is typically represented by a network constructed of vehicles in a range wherein they are able to directly communicate with each other. The vehicles effect communication according to the method described in "(1) Communication procedure" above. All communicating parties who meet the following member conditions are registered in a member table. More specifically, all vehicles located in a range permitting direct communication are registered, and information to be exchanged among the registered vehicles includes the positions (latitudes, longitudes and altitudes), speeds and the types (models and colors) of signal sender vehicles. The resource information includes the performance of in-vehicle equipment, such as the size of a display area, a memory capacity, the availability of a text-to-speech (TTS) feature, etc. This type of network may be used when a driver, who is making a right turn at an intersection, wishes to communicate with the driver of an oncoming vehicle to which special attention should be paid, or when a driver wishes to communicate with the driver of a vehicle approaching from behind on a express highway at the time of entering a main lane of the express highway.

b. Same Lane Drivers Network

This type of network includes vehicles moving in the same direction or toward the same destination. It is possible to determine in which directions other vehicles are moving in relation to a signal sender vehicle on the basis of the locations and moving directions. For a vehicle that cannot be directly communicated with, information is passed on to acquire the information of a vehicle preceding the signal sender vehicle, thereby registering the preceding vehicle as a member. Information to be exchanged includes the positions (latitudes, longitudes and altitudes) and speeds of signal sender vehicles. Resource information includes the performance of in-vehicle equipment and information regarding the availability of a camera. This type of network may be used to determine whether traffic is heavy or whether there is a traffic jam ahead by finding the speed of a preceding vehicle. In this case, if the preceding vehicle has a camera, which can be known by the resource information, then an image taken by the camera can be obtained.

c. Communication Navigator Users Network

The members of this type of network include the vehicles having car navigators that are made by the same manufacturer or use the same map database, i.e., the vehicles that can share car navigator data among them. This network may be used by a member who has lost a map and is trying to contact a map providing center in vain due to a busy line. The network enables the member to acquire map information from a neighboring member.

d. Peers Network

This type of network includes members, such as school mates or business colleagues, who share the same hobbies or belong to the same organization. The network is similar to a ham or personal radio network used by truck drivers.

e. Selecting and Communicating Through Actuated Networks

An automatic condition determining back end unit HMI of the inter-vehicle communication controller CMU selects a virtual logic network capable of providing required information from among a plurality of virtual logic networks (NSL) according to an environment or condition of a driver or a vehicle or in response to a driver's request. The HMI sets the selected virtual logic network as an actuated network, and establishes connection with a predetermined mobile unit in the actuated network to request the necessary information or provide requested information. The timing at which a network is selected and actuated to effect communication is when, for example, an environment or condition of a vehicle changes, the environment surrounding a driver changes, or a driver issues a request, or an emotional change of a driver takes place.

f. Construction of the Inter-vehicle Communication Controller (CMU)

Figure 4:
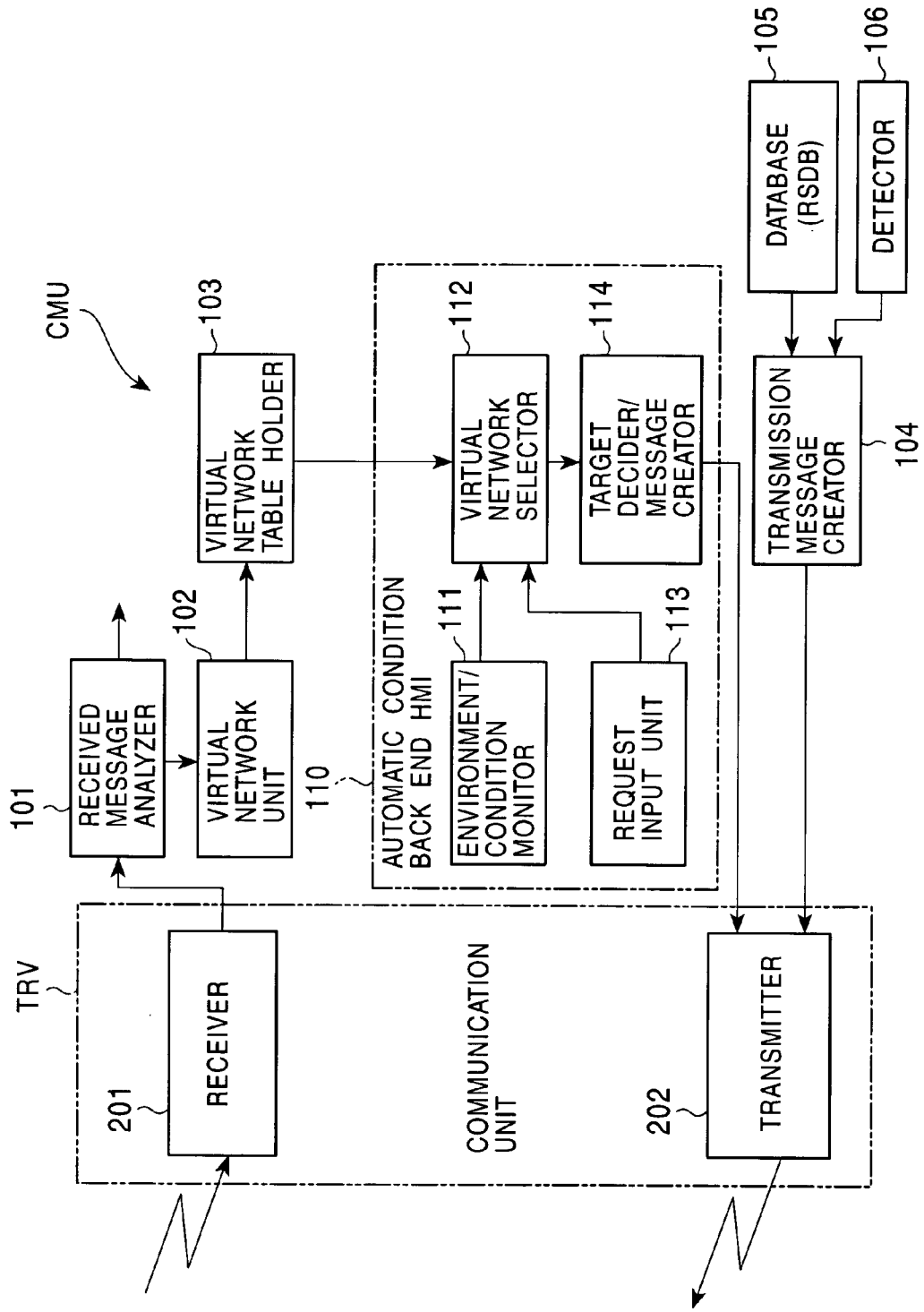
FIG. 4 is a block diagram of an inter-vehicle communication controller.

FIG. 4 is a block diagram of the inter-vehicle communication controller CMU. A received message analyzer 101 of the inter-vehicle communication controller CMU analyzes a received message from a receiver 201 and if the message carries the ID information, resources or the like of a communicating party vehicle, then it supplies the received message to a virtual network unit 102. The virtual logic network unit 102 corresponds to the resource search engine RSEJ and the virtual member selecting block MSB shown in FIG. 3 and carries out the same processing. More specifically, the virtual network unit 102 refers to received information to determine a virtual logic network to which a communicating party vehicle belongs, and registers the communicating party vehicle in the member table MBTi of a network table holder 103 as a member of the virtual logic network. At the same time, the virtual network unit 102 registers the resources related to the network owned by the communicating party vehicle in the resource table RSTi.

Meanwhile, the inter-vehicle communication controller CMU controls a transmission message creator 104 to send information on its own ID, resources, etc. to another vehicle. The transmission message creator 104 uses various types of information of a resource database (RSDB) 105 or the information on the position of its own vehicle detected by a position detector 106 to create ID information, resource information, etc. and sends the created information to a member vehicle through a transmitter 202.

In a state wherein some virtual logic networks have been formed, an environment/condition monitor 111 of the HMI 110 monitors the environments and conditions of drivers and vehicles and supplies monitoring results to a virtual network selector 112. A request input unit 113 supplies a driver's request to the virtual network selector 112. The virtual network selector 112 selects an optimum virtual logic network from among a plurality of virtual logic networks on the basis of changes in vehicular environments or conditions, or in driver's emotions or physical conditions, or in response to a driver's requests. A target decider/message creator 114 sets the selected virtual logic network as an active network, creates a transmission message requesting or reporting necessary information, and transmits the message to a predetermined mobile unit making up the active network.

Figure 5:
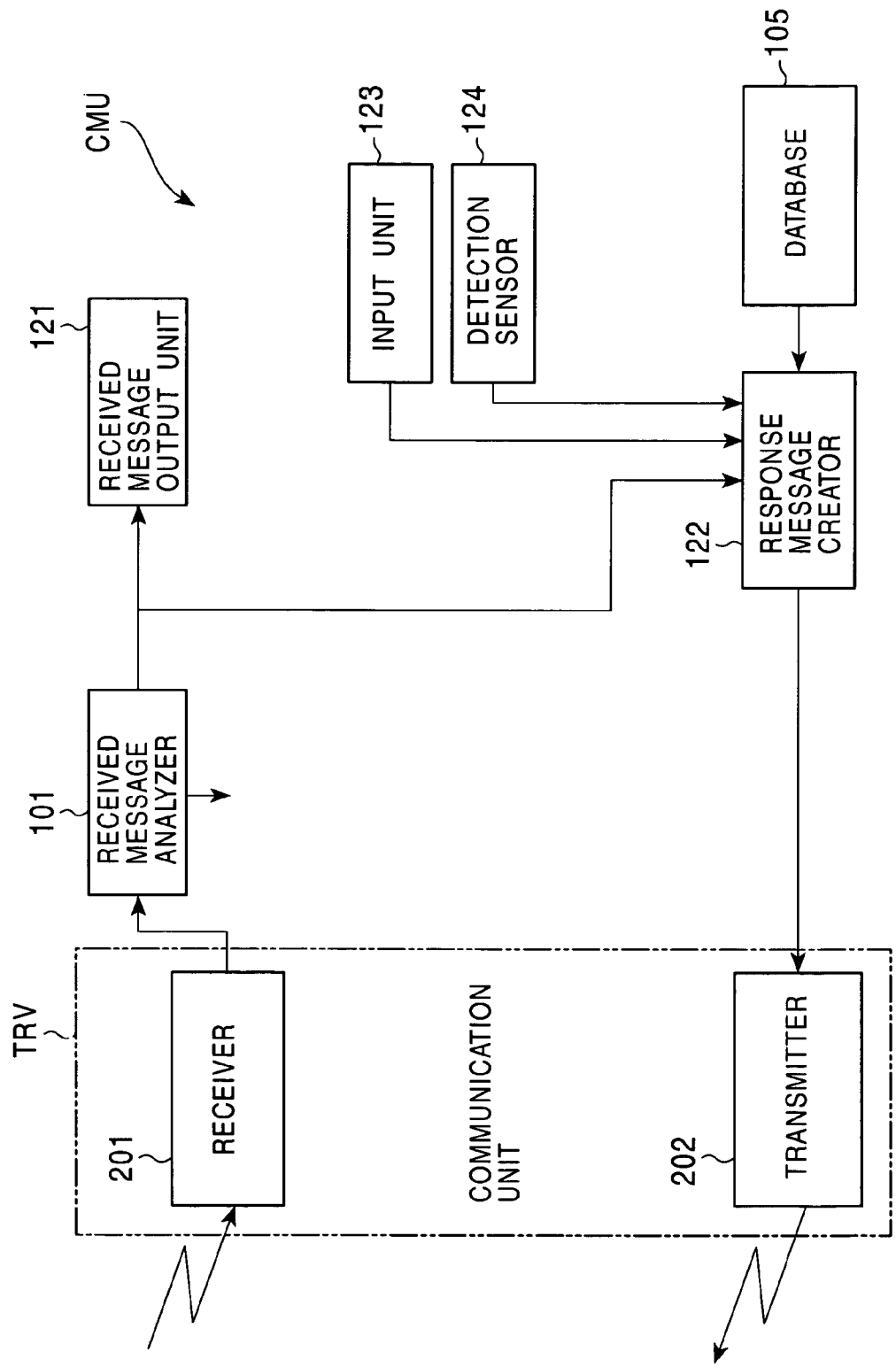
FIG. 5 is a block diagram of an inter-vehicle communication controller when it receives an information request message or an information supply message.

FIG. 5 is a block diagram of the inter-vehicle communication controller CMU when it receives an information request message or an information supply message. The same parts as those shown in FIG. 4 are assigned the same reference numerals. A received message analyzer 101 supplies a received message, i.e., an information request message or an information supply message, to a received message output unit 121 and a response message creator 122. The received message output unit 121 visually displays or audibly outputs the message if the message is to be supplied as an output.

Figure 6:
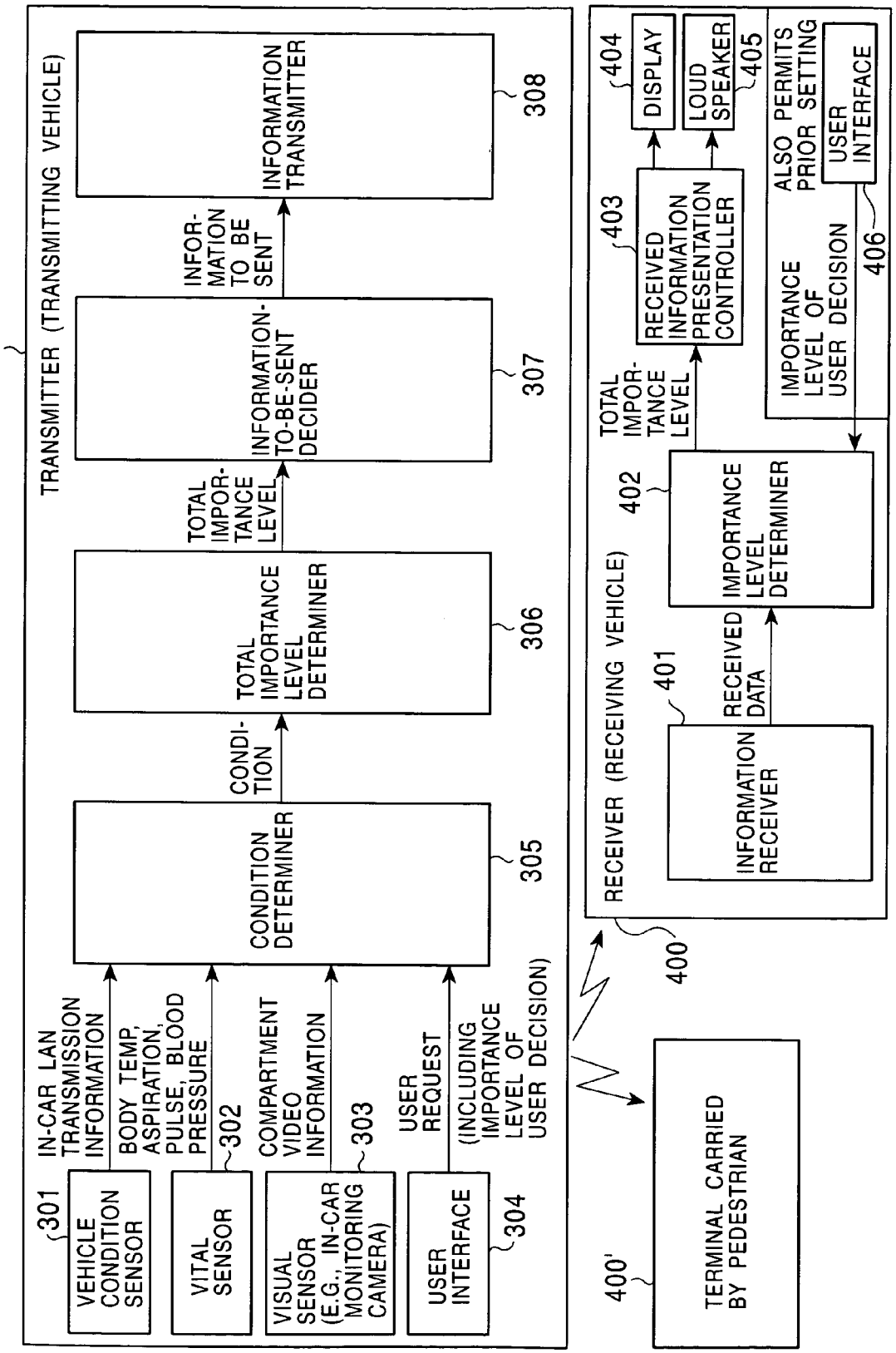
FIG. 6 is an embodiment adapted to automatically detect an anomaly or accident in a vehicular compartment and notify a neighboring vehicle driver or a pedestrian.

The response message creator 122 uses the data supplied from the input unit 123, the data detected by a detection sensor 124 and the data in a database 105 to create a response message based on a received request, and transmits the created message through a transmitter 202.

g. Example of Communication Effected in Response to a Change in a Driver's Physical Conditions Unless a vehicle is significantly deformed with a loud noise due to a traffic accident, an anomaly taking place inside a vehicle compartment, which is a closed space, may not be visually known from outside even if an anomaly or accident, including a driver developing a sudden bad physical condition, is occurring therein. FIG. 6 illustrates an embodiment adapted to automatically detect an anomaly or accident in a vehicular compartment and notify a neighboring vehicle driver or a pedestrian.

A vehicular communication apparatus shown in FIG. 6 is formed of a transmitter 300 and a receiver 400. The transmitter 300 has sensors 301 through 303 for monitoring various conditions, a user interface 304 through which a user request or a user decision is entered, a condition determiner 305 for determining a condition in a vehicular compartment, a total importance level determiner 306 for determining the level of importance or emergency related to the need for communication with neighboring members on the basis of a determined condition in the vehicular compartment, an information-to-be-sent decider 307 for deciding on a specific means for indicating communication information on the basis of a total importance level if it is determined that communication with neighboring members is necessary, and an information transmitter 308 for wirelessly transmitting necessary information to neighboring members. The sensors mainly include a vehicular condition sensor 301 for monitoring vehicular conditions, a vital sensor 302 for detecting the body temperature, respiration, pulses, blood pressure, etc. of a driver, and a visual sensor 303 for monitoring the conditions in a vehicular compartment.

Except for the case of a serious accident or a user having lost his or her consciousness due to a serious physical condition, a final decision on the transmission of information will be made by a user. Such a user decision is entered to the condition determiner 305 through the user interface 304. The user enters a level of importance or emergency in addition to the information to be sent. An objective level of importance or emergency cannot be decided merely by a user's subjectivity. For this reason, the total importance level determiner 306 decides a total importance or emergency level by comprehensively judging a user's opinion and the data received from the diverse sensors.

The receiver 400 has an information receiver 401 for receiving information wirelessly transmitted, an importance level determiner 402 for determining the importance level or the emergency level of received information, a received information presentation controller 403 for deciding on a specific means for furnishing a user with received information if it determines that received information should be conveyed to the user, a display unit 404 for displaying received information, a loud speaker 405 for audibly outputting received information, and a user interface 406. A user enters the importance level or the emergency level of information to be received to the importance level determiner 402 through the user interface 406. The prior definition of the importance levels makes it possible to prevent information of a low importance level from being output. A receiving user may enter an acknowledgement response through the user interface to transmit it to a signal sender vehicle.

A receiver 400' is a receiver of a PDA carried by a pedestrian and has the same construction as that of the vehicular receiver 400 and is capable of supplying received information, as necessary.

The arrangement described above makes it possible to detect an anomaly or accident, such as a case where a driver suddenly develops a bad physical condition, if it happens in a vehicular compartment, and automatically communicate with another mobile unit making up a neighboring vehicle drivers network to notify the mobile unit of the occurrence of the anomaly.

What is claimed is:

1. An automatic method for communication among mobile units, comprising the processing acts in a vehicle-mounted mobile unit of:

defining a plurality of virtual logic networks, where each virtual logic network is formed of mobile units that satisfy a predetermined membership condition associated with the virtual logic network;

acquiring information from another mobile unit through a physical network of mobile units located within a physically communicable range;

registering the another mobile unit as a member of a virtual logic network if the another mobile unit satisfies the predetermined membership condition associated with the virtual logic network by referring to the acquired information of the another mobile unit;

monitoring at least one of the vehicle environment and a condition associated with the mobile unit for a predetermined event; and automatically selecting an appropriate virtual logic network according to a monitored event when the event takes place, selecting a communicating party from among the members of the selected virtual logic network, and communicating with the selected party.

2. The method for communication among mobile units according to claim 1, wherein the act of registering a member creates a member table for registering members of networks in association with the virtual logic networks and also creates a resource table for registering a capability of each member, and the act of selecting a communicating party further comprises using the member table of the virtual logic networks and the resource table to perform communication with the selected party.

3. The method for communication among mobile units according to claim 1, wherein the physical network is formed by exchanging predetermined information among vehicular communication apparatuses mounted in individual vehicles.

4. The method for communication among mobile units according to claim 3, wherein the predetermined information includes at least the identity and position of a mobile unit.

5. An automatic method for communication among mobile units, comprising the processing acts in a vehicle-mounted mobile unit of:

acquiring information from another mobile unit through a physical network of mobile units located within a physically communicable range;

defining a plurality of virtual logic networks, wherein each virtual logic network is associated with a different predetermined condition for membership;

registering the another mobile unit as a member of a virtual logic network if the another mobile unit satisfies the predetermined membership condition associated with the virtual logic network by referring to the acquired information of the another mobile unit;

monitoring at least one of the vehicle environment or situation of a driver of the vehicle;

automatically selecting one virtual logic network from among the plurality of virtual logic networks on the basis of an environment or situation change; and setting the selected virtual logic network as an active network.

6. The method for communication among mobile units according to claim 5, wherein the act of registering members further comprises:

receiving information for specifying a mobile unit identity and a condition from a mobile unit, and referring to the received information, and if the mobile unit satisfies any one of various conditions, then registering the mobile unit as a network member of a virtual network based on the condition.

7. The method for communication among mobile units according to claim 5, wherein the act of registering members further comprises registering the capabilities of members in virtual logic networks to which they belong in association with the network members.

8. The method for communication among mobile units according to claim 7, wherein a member table for registering members of the networks and a resource table for registering a capability of each member are created in association with virtual logic networks.

9. The method for communication among mobile units according to claim 5, wherein a particular member is selected from among the members constituting the active network on the basis of an environment or situation change of the driver or vehicle or in response to a driver's request, and a connection to the selected member is established to communicate with the member.

10. A vehicular communication apparatus mounted in a vehicle to communicate with another mobile unit, comprising:

a controller for defining a plurality of virtual logic networks, where each virtual logic network is formed of mobile units that satisfy a predetermined membership condition associated with the virtual logic network;

an information acquirer for acquiring information from another mobile unit through a physical network of mobile units located within a physically communicable range;

a registrar for registering, in a member table, the another mobile unit as a member of a virtual logic network if the another mobile unit satisfies a predetermined membership condition associated with the virtual logic network by referring to the acquired information of the another mobile unit;

an environment/condition monitor for monitoring at least one of the vehicle environment or condition of a driver for a predetermined event; and a communicating party selector for automatically selecting a communicating party by using the table of the virtual logic networks according to a monitored event when the event takes place and communicating with the selected party.

11. The vehicular communication apparatus according to claim 10, wherein the registrar further creates a resource table for registering the capabilities of members in virtual logic networks to which they belong in association with the members, and the communicating party selector carries out communication by using the member table of virtual logic networks and the resource table according to an event when the event takes place.

12. The vehicular communication apparatus according to claim 10, comprising an inter-vehicle transmitter/receiver and an inter-vehicle controller.

13. The vehicular communication apparatus according to claim 12, wherein the inter-vehicle controller has resource databases, such as a map database, a know-how database, a user profile database and an emergency database.

14. A vehicular communication apparatus mounted in a vehicle to communicate with another mobile unit, comprising:

an information acquirer for acquiring information from another mobile unit through a physical network of mobile units located within a physically communicable range;

a network definer for defining a plurality of virtual logic networks, wherein each virtual logic network is associated with a different predetermined membership condition for membership;

a registrar for registering the another mobile unit as a member of a virtual logic network if the another mobile unit satisfies the predetermined condition associated with the virtual logic network by referring to the acquired information of the another mobile unit;

a monitor for monitoring at least one of the vehicle environment or situation of a driver; and a communicating party selector for automatically selecting a particular virtual logic network from the plurality of virtual logic networks on the basis of an environment or situation change, setting the selected virtual logic network as an active network, and selecting a communicating party to effect communication with the selected party.

15. The vehicular communication apparatus according to claim 14, wherein the registrar receives information for specifying a mobile unit identity and a condition from a mobile unit, and refers to the received information, and if the mobile unit satisfies any one of various conditions, then registers the mobile unit as a network member of a virtual network based on the condition.

16. The vehicular communication apparatus according to claim 15, wherein the registrar further registers the capabilities of members in virtual logic networks to which they belong in association with the individual network members.

17. The vehicular communication apparatus according to claim 14, wherein the registrar creates a member table for registering members of the networks in association with the virtual logic networks and also creates a resource table for registering a capability of each member.

18. The vehicular communication apparatus according to claim 14, wherein the communicating party selector further selects a particular member from among the members constituting the active network on the basis of an environment or situation change of the driver or vehicle or in response to a driver's request, and establishes a connection to the selected member to communicate therewith.

19. A vehicular communication apparatus mounted in a vehicle to communicate with another mobile unit, comprising:

an information acquirer for acquiring information from another mobile unit through a physical network of mobile units located within a physically communicable range;

a network definer for defining a plurality of virtual logic networks, wherein each virtual logic network is associated with a different predetermined membership condition for membership;

a registrar for registering the another mobile unit as a member of a virtual logic network if the another mobile unit satisfies the predetermined condition associated with the virtual logic network by referring to the acquired information of the another mobile unit;

a sensor for detecting a physical condition of a driver in the vehicle;

a monitoring sensor for monitoring a condition in the vehicle;

a condition determiner for determining the condition of the driver on the basis of detection signals of the sensors;

an importance level determiner for determining an importance level regarding the necessity for communication with another mobile unit on the basis of the condition;

an information-to-be-sent decider for deciding on information to be sent on the basis of the importance level when it is determined necessary to communicate with another mobile unit;

a communicating party selector for selecting a particular virtual logic network from the plurality of virtual logic networks and selecting another mobile unit from the selected virtual logic network; and an information transmitter for wirelessly transmitting the information to be transmitted to the selected mobile unit.

20. The vehicular communication apparatus according to claim 19, further comprising:

an information receiver for receiving information wirelessly transmitted;

an importance level determiner for determining the importance level of the received information; and an information output unit for supplying the received information if it is determined that the received information should be supplied to a user.

* * * * *